United States Patent [19]

Labana et al.

[11] 4,091,049

[45] * May 23, 1978

[54] POWDER COATING COMPOSITIONS CONTAINING GLYCIDYL ESTER COPOLYMERS AND CARBOXYL TERMINATED CROSSLINKING AGENT

[75] Inventors: Santokh S. Labana, Dearborn Heights; Yun-Feng Chang, Plymouth, both of Mich.

[73] Assignee: Ford Motor Company, Dearborn, Mich.

[ * ] Notice: The portion of the term of this patent subsequent to Dec. 25, 1990, has been disclaimed.

[21] Appl. No.: 425,745

[22] Filed: Dec. 18, 1973

Related U.S. Application Data

[63] Continuation-in-part of Ser. No. 172,229, Aug. 16, 1971, Pat. No. 3,781,380.

[51] Int. Cl.$^2$ ............................................. C08L 63/00
[52] U.S. Cl. ................................. 260/836; 260/30.6 R; 260/31.8 E; 260/37 EP; 260/78.4 EP; 260/830 R; 260/830 TW; 260/835; 260/837 R; 260/DIG. 17; 427/27; 428/417; 428/418
[58] Field of Search ............... 260/836, 830 TW, 837, 260/835, 78.4 EP; 427/27

[56] References Cited

U.S. PATENT DOCUMENTS

| | | | |
|---|---|---|---|
| 2,857,354 | 10/1958 | Fang | 260/78.4 R |
| 3,058,947 | 10/1962 | Fryling | 260/831 |
| 3,070,564 | 12/1962 | Roeser | 260/836 |
| 3,222,419 | 12/1965 | Jubilee | 260/836 |
| 3,297,621 | 1/1967 | Taft | 260/836 |
| 3,514,419 | 5/1970 | Darlow | 260/836 |
| 3,541,055 | 11/1970 | Malamet | 260/78.4 EP |
| 3,730,930 | 5/1973 | Labana | 260/836 |
| 3,752,870 | 8/1973 | Labana | 260/836 |
| 3,781,380 | 12/1973 | Labana | 260/836 |
| 3,787,521 | 1/1974 | Labana | 260/836 |
| 3,808,114 | 4/1974 | Tsuchihara | 204/159.16 |

OTHER PUBLICATIONS

Detroit Society for Paint Technology: Journal of Paint Technology, vol. 44, No. 565, Feb. 1972, pp. 30-37.

*Primary Examiner*—Theodore E. Pertilla
*Attorney, Agent, or Firm*—Roger L. May; Keith L. Zerschling

[57] ABSTRACT

Powder coating compositions are disclosed which, exclusive of pigments and other nonreactive components, comprise a coreactive mixture of: (A) a copolymer of between about 8 and about 30 weight percent of a glycidyl ester of a monoethylenically unsaturated acid and between about 92 and about 70 weight percent of other monoethylenically unsaturated monomers, said copolymer having a glass transition temperature in the range of 40° C to 90° C and a number average molecular weight ($\overline{M}_n$) in the range of about 2500 to about 8500; and (B) a carboxyl terminated crosslinking agent in the amount of 0.8 to 1.2 carboxyl groups for each epoxy group in the copolymer.

22 Claims, No Drawings

POWDER COATING COMPOSITIONS CONTAINING GLYCIDYL ESTER COPOLYMERS AND CARBOXYL TERMINATED CROSSLINKING AGENT

This application is a continuation-in-part of application Ser. No. 172,229, filed Aug. 16, 1971 now U.S. Pat. No. 3,781,380, and relates to thermosetting powder paint compositions which are useful for providing protective and decorative surface coatings on a variety of substrates including glass, metal and other substrates which can withstand the curing temperature of the powder.

Powder coating compositions have become increasingly desirable in recent years for various reasons including those relating to ecology, health and safety. In particular, powder coating compositions are preferable to liquid paints. Such paints contain large amounts of solvents which must be volatilized after application, thus resulting in solvents escaping into the atmosphere and creating health and safety hazards as well as undesirable pollution problems. The powder coating compositions of this invention, on the other hand, release little, if any, volatile material when cured. In addition, the powders have good stability at room temperature, have fast cure times at elevated temperatures and form hard coatings exhibiting excellent solvent resistance.

SUMMARY OF THE INVENTION

The powder coating compositions of this invention, exclusive of pigments and other nonreactive components, comprise a coreactable mixture of: (A) a copolymer of between about 8 and about 30 weight percent of a glycidyl ester of a monoethylenically unsaturated acid and between about 92 and about 70 weight percent of other monoethylenically unsaturated monomers, said copolymers having a glass transition temperature in the range of 40° C to 90° C and a number average molecular weight ($\overline{M}_n$) of between about 2500 and about 8500 and (B) a carboxyl terminated crosslinking agent in the amount ranging from about 0.8 to about 1.2 carboxyl groups for each epoxy group in the copolymer. In addition, the powder coating compositions may include additives such as catalysts, flow control agents, antistatic agents, pigments, plasticizers, etc.

PRIOR ART

The use of glycidyl methacrylate copolymers and dicarboxylic acid crosslinking agents in a liquid paint system is described in U.S. Pat. No. 2,857,354. However, the powder coating composition of this invention are substantially different than the liquid paint compositions described in the examples of that patent. The difference can be best illustrated by attempting to prepare powder coating compositions by evaporating the solvents from the liquid paint systems described in the example of the patent. Dry powders cannot be prepared from the compositions of Examples 4 and 5 of the patent. Powders prepared from the compositions of Examples 1, 2, 3 and 6 when deposited on a metal panel, do not fuse together to form a smooth and glossy film when the panels are baked at 150° to 200° C for 20 minutes. The baked coatings on test panels are not smooth, but rather, are rough. Also, the baked coatings exhibit very low gloss, poor adhesion and lack of flexibility. It, therefore, can be concluded that compositions which are generally suitable for liquid paints are not necessarily made suitable for powder paints merely by evaporating the solvents therefrom.

The use of a dicarboxylic acid as a crosslinking agent for glycidyl methacrylate terpolymers is mentioned in U.S. Pat. No. 3,058,947. In order to test these materials, compositions of Example VII of the patent are dried by evaporating solvents under vacuum. The materials are ground to pass through a 200 mesh screen. Samples of the ground powder are deposited on metal panels and baked at 160° C for 45 minutes. The coatings obtained show an abundance of craters, are inferior in gloss and smoothness, and lack the impact properties described in Example VII. It is, therefore, concluded that there is a substantial difference in paint films produced on a panel when the coating is produced on one hand by a liquid system and, on the other hand, by a powder system. Other improvements specific to the powders are needed in order to obtain paints of acceptable quality. The reason for the difference in properties and appearance between powder coatings derived by solvent evaporation from such liquid coatings and the liquid coatings themselves is not clear. It is, however, certain that the powders obtained by drying such a liquid paint composition is not useful as a powder coating composition.

DETAILED DESCRIPTION OF THE INVENTION

Epoxy Functional Copolymer

The principal material in the powder coating compositions of this invention is an epoxy functional copolymer which may be formed by conventional free radical induced polymerization of suitable unsaturated monomers. The term "copolymer" as used herein means a polymer of two or more different monomers.

The copolymers used in the invention contain between about 8 and about 30 weight percent, preferably between about 10 and about 25 weight percent, and still more preferably between about 12 and about 20 weight percent of a glycidyl ester of a monoethylenically unsaturated carboxylic acid, e.g., glycidyl acrylate and glycidyl methacrylate. These monomers provide the copolymer with its pendant epoxy functionality.

The remainder of the monomers forming the epoxy-functional copolymer, i.e., between about 92 and about 70 weight percent, preferably between about 90 and about 75 weight percent, and most preferably between about 88 and about 80 weight percent, and other monoethylenically unsaturated monomers. These monoethylenically unsaturated monomers are preferably alpha-beta olefinically unsaturated monomers, i.e., monomers bearing olefinic unsaturation between the two carbon atoms in the alpha and beta positions with respect to the terminus of an aliphatic carbon-to-carbon chain.

Among the alpha-beta olefinically unsaturated monomers which may be employed are acrylates (meaning esters of both acrylic and methacrylic acids) as well as mixtures of acrylates and vinyl hydrocarbons. Preferably, in excess of 50 weight percent of the total of copolymer monomers are esters of a $C_1 - C_{12}$ monohydric alcohols and acrylic or methacrylic acid, e.g., methyl methacrylate, ethyl acrylate, butyl acrylate, butyl methacrylate, hexyl acrylate, 2-ethyl hexyl methacrylate, lauryl acrylate, etc. Among the monovinyl hydrocarbons suitable for use in forming the copolymer are those containing 8 or 9 carbon atoms and including styrene, alpha methyl styrene, vinyl toluene, t-butyl styrene and chlorostyrene. When such monovinyl hydrocarbons are employed, they should constitute less than 50 weight percent of the copolymer. Other vinyl monomers such as vinyl chloride, acrylonitrile, methacrylonitrile and vinyl acetate may be included in the copolymer as modifying monomers. However, when employed, these modifying monomers should constitute only between about 0 and about 35 weight percent of the monomers in the copolymer.

The epoxy functional copolymers used in these coating compositions have a glass transition temperature between about 48° C and about 90° C, preferably between about 50° C and about 80° C, and most preferably between about 55° C and 70° C. The molecular weight ($\overline{M}_n$) range for the copolymer may be between about 2500 and about 8500, preferably between about 3000 and about 6500 and more preferably between about 3000 and about 4000.

A preferred copolymer for use in the coating compositions of this invention has a glass transition temperature between about 50° C and about 80° C and a molecular weight of between about 3000 and about 6500. A still more preferred copolymer has a glass transition temperature between about 55° C and about 70° C and a molecular weight between about 3000 and 4000.

In preparing the copolymer, the epoxy functional monomer and the remaining monoethylenically unsaturated monomers are mixed and reacted by conventional free radical initiated polymerization in such proportions as to obtain the copolymer desired. A large number of free radical initiators are known to the art and are suitable for this purpose. These include benzoyl peroxide; lauryl peroxide; t-butylhydroxy peroxide; acetylcyclohexane sulfonyl peroxide; diisobutyryl peroxide; di-(2-ethylhexyl) peroxydicarbonate; diisopropyl peroxydicarbonate; t-butylperoxypivalate; decanoyl peroxide; azobis(2-methyl-propionitrile); etc. The polymerization is preferably carried out in solution using a solvent in which the epoxy functional copolymer is soluble. Included among the suitable solvents are toluene, xylene, dioxane, butanone, etc. If the epoxy functional copolymer is prepared in solution, the solid copolymer can be precipitated by pouring the solution at a slow rate into a non-solvent for the copolymer such as hexane, octane, or water under suitable agitation conditions. The copolymer thus obtained is then further dried so that it contains less than 3 percent of the materials that volatilize at the temperatures used for baking the coatings. Alternatively, the copolymer can be obtained by evaporating the solvents under vacuum or by employing spray drying techniques.

These copolymers can also be prepared by emulsion polymerization, suspension polymerization, bulk polymerization or other suitable methods. In these methods of preparing the copolymers, chain transfer agents may be required to control the molecular weight of the copolymer to a desired range. However, when the chain transfer agents are used care must be taken so that they do not decrease the shelf stability of the powder by causing premature chemical reaction. The solid copolymers obtained by these methods must also be dried to contain less than 3% of the materials that volatilize at the temperatures used for baking the coatings.

The molecular weight and molecular weight distribution of the epoxy functional copolymer is important in obtaining outstanding powder coating compositions. While the molecular weight ($\overline{M}_n$) ranges from about 2500 to about 8500, the copolymer component must not contain significant amounts of higher molecular weight fractions. No more than 5% of the copolymer should be of molecular weight greater than 20,000 and the molecular weight distribution as measured by the ratio of weight average molecular weight to number average molecular weight ($\overline{M}_w/\overline{M}_n$) should be in the range of 1.6 to 3.0. The preferred range of molecular weight distribution is in the range of 1.7 to 2.2.

CARBOXYL TERMINATED CROSSLINKING AGENT

The crosslinking agent of the powder coating compositions of this invention is a carboxyl terminated compound bearing at least two carboxyl groups per molecule which is present in an amount ranging from about 0.8 to about 1.2 carboxyl groups for each epoxy group in the above-discussed copolymer. This crosslinking agent reacts with the epoxy functional copolymer upon exposure to heat to form a hard, cured film. Among the many suitable carboxyl terminated crosslinking agents for use in the invention are those selected from the group consisting of: (1) carboxyl terminated epoxy esters; (2) mixtures of carboxyl terminated epoxy esters and a saturated, aliphatic monocarboxylic acid having 10 to 22 carbon atoms per molecule, said monocarboxylic acid comprising up to 10% by equivalent weight of the mixture; (3) carboxyl terminated polyesters; (4) carboxyl terminated polybutadiene; (5) carboxyl terminated random copolymers of butadiene and acrylonitrile; (6) saturated aliphatic dicarboxylic acids containing 4 to 20 carbon atoms; (7) mixtures of saturated aliphatic dicarboxylic acids containing 4 to 20 carbon atoms and saturated aliphatic monocarboxylic acids containing 10 to 22 carbon atoms per molecule, said monocarboxylic acid comprising from about 2 to about 10 percent by equivalent weight of said mixture, and (8) mixtures thereof.

The preferred carboxyl terminated epoxy esters for use in the powders of the invention have a molecular weight ranging from about 650 to about 3000. These preferred epoxy esters may be prepared by reacting 1 equivalent weight of an epoxy resin having a molecular weight in the range of 250 to 2000 with 1½ to 3 equivalent weights of a saturated, dicarboxylic acid containing 4 to 22 carbon atoms per molecule. Representative of the many suitable dicarboxylic acids for reacting with the epoxy resins are: adipic acid; sebacic acid; pimelic acid; suberic acid; azelaic acid; and brassylic acid. Among the many suitable epoxy resins for forming the carboxyl terminated polymer are 1,4-butane diol diglycidyl ether (hereinafter identified by the tradename TRD-2 as manufactured by Ciba Products Company), di(3,4-epoxy-6-methylcyclohexyl methyl) adipate (hereinafter identified by the tradename CY-178 as manufactured by Ciba Products Company) and epoxy resins having the structural formula indicated below:

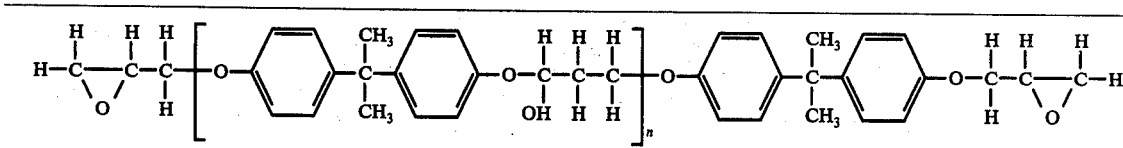

Representative of the resins having the above structural formula are Epon 828, Epon 1001, Epon 1002 and Epon 1004, the properties of which are summarized below:

| Trade Mark of Shell Co. | Melting Range °C | Epoxide Equivalent | Molecular Weight Average | n in the formula Average value |
|---|---|---|---|---|
| Epon 828 | liquid | 175–210 | 380 | 0 |
| Epon 1001 | 64–76 | 450–550 | 950 | 2 |
| Epon 1002 | 75–85 | 600–700 | 1300 | 3 |
| Epon 1004 | 95–105 | 875–1025 | 1800 | 5 |

The dicarboxylic acid and the epoxy resin may be either fully reacted to form the crosslinking agent or only semi-reacted to form the crosslinking agent. When the acid and resin are only semi-reacted, the completion of the reaction therebetween takes place during the baking of the powder to produce a finished coating. The technique of semi-reaction is used when the fully reacted ester is not suitable for powdering and the semi-reacted materials are suitable for powdering. The use of carboxyl terminated polymeric crosslinking agents which are not friable powders, but are viscous liquids, or are difficult to grind, is limited so that the useful weight percentage of such a crosslinking agent is limited to a minor constituent of the powder.

If a greater degree of flexibility is desired in cured powder coatings containing the aforementioned epoxy esters, up to 10 percent by equivalent weight of the carboxyl terminated epoxy ester crosslinking agent may be replaced with a saturated aliphatic monocarboxylic acid containing 10 to 22 carbon atoms per molecule. Representative of the many monocarboxylic acids which may be employed are: lauric acid; tridecanoic acid; myristic acid, pentadecanoic acid; palmitic acid; marganic acid; and stearic acid.

The carboxyl terminated polyesters which may be employed as crosslinking agents in the powders of the invention are polycondensation reaction products of cyclic or aliphatic dicarboxylic acids or their anhydrides and cyclic or aliphatic polyols. These carboxyl terminated polyesters preferably have molecular weights between about 500 and about 2500. Among the many polyols which may be reacted with the dicarboxylic acids to form the carboxy terminated polyesters are butane diol, glycerol, pentaerythritol, trimethyolpropane, trimethylolethane, ethylene glycol, diethylene glycol, propylene glycol and Bisphenol A. Representative of the numerous dicarboxylic acids useful in forming carboxyl terminated polyester crosslinking agents are adipic acid; azelaic acid; o-phthalic acid; terephthalic acid; 1,2-cyclohexane dicarboxylic acid; 1,4-cyclohexane dicarboxylic; 2,3-bicycloheptane dicarboxylic acid; 2,3-bicyclo octane dicarboxylic acid; and 4,4'-sulfonyldibenzoic acid. Among the many dicarboxylic acid anhydrides which may be employed are: succinic anhydride; hexahydrophthalic anhydride; phthalic anhydride; trimellitic anhydride; pyromellitic anhydride; and chlorendic anhydride.

The carboxyl terminated polybutadienes and butadiene-acrylonitrile copolymers useful as crosslinking agents generally have molecular weights ($M_n$) between about 800 and about 3000, preferably between about 1000 and about 2500. The butadiene-acrylonitrile copolymer preferably is a random copolymer containing between about 25 and about 50 weight percent of acrylonitrile.

The saturated, aliphatic dicarboxylic acids useful as crosslinking agents in the powder coating compositions of this invention should contain between about 4 and about 20 carbon atoms per molecule. More preferably, however, the dicarboxylic acids should contain between about 5 and about 13 carbon atoms per molecule. Included among the many suitable acids falling within these ranges are: adipic acid, pimelic acid, suberic acid, azelaic acid, sebacic acid, undecanoic acid, and brassylic acid.

As a further alternative, the crosslinking agent may comprise a mixture of from about 90 to about 98 percent by equivalent weight of a saturated, aliphatic carboxylic acid containing 4 to 20 carbon atoms and between about 2 to about 10 percent by equivalent weight of a saturated, aliphatic monocarboxylic acid containing 10 to 22 carbon atoms. Representative of the many mono- and dicarboxylic acids which may be used are those set forth above.

ADDITIONAL ADDITIVES

The coating compositions formed in accordance with the teachings of this invention may include a small amount, generally from about 0.05% by weight to about 1.0% by weight of the total weight of the powder composition, of a catalyst in order to increase the crosslinking rate of the powder coating during baking. Baking temperatures ordinarily are in the range of about 130° C to about 200° C and the catalyst should produce a gel time at the baking temperature of between about one minute and about 40 minutes. Preferably, however, the gel time is in the range of about one to about 12 minutes and most preferably is in the range of about 2 to about 8 minutes. Among the many suitable catalyst, which are preferably solid at room temperature and have a melting point of from 50° C to 200° C are tetralkylammonium salts, imidazole type catalysts, tertiary amines and metal salts of organic carboxylic acids. Suitable tetralkylammonium salt catalysts include: tetrabutyl ammonium chloride (bromide or iodide); tetraethyl ammonium chloride (bromide or iodide); tetramethyl ammonium chloride (bromide or iodide); trimethyl benzyl ammonium chloride, dodecyl dimethyl (2-phenoxyethyl) ammonium bromide and diethyl (2-hydroxy ethyl) methyl ammonium bromide.

Suitable catalysts of the imidazole type include: 2-methyl-4-ethyl imidazole, 2-methyl imidazole, imidazole, 2-[(N-benzylanilino) methyl]- 2-imidazoline phosphate and 2-benzyl-2-imidazoline hydrochloride. Suitable tertiary amine catalysts for the powder coating compositions of this invention include: triethylenediamine, N,N-diethylcyclohexylamine, and N-methyl morpholine. The metal salts of organic carboxylic acids which are catalysts for the powder coatings of the invention include, but are not limited to: stannous octoate, zinc naphthenate, cobalt naphthenate, zinc octoate, stannous 2-ethylhexoate, phenylmercuric propionate, lead neodecanoate, dibutyl tin dilaurate and lithium benzoate.

The powder paint composition also may advantageously include a flow control agent in an amount ranging from about 0.05 weight percent to about 4.0 weight percent of the total powder composition. In general the flow control agent should be a polymer having a number average molecular weight of at least 1000 and a glass transition temperature at least 50° C below the glass transition temperature of the epoxy functional copolymer. This flow control agent may be an acrylic polymer which may be prepared by polymerization of acrylate and methacrylate monomers in bulk or in suitable solvents using well known free radical initiators. The amount of initiator and polymerization conditions are chosen so that the polymer has a molecular weight ($\overline{M}_n$) above 1000, preferably above 5000 and most preferably between about 6000 and about 20,000. Among the preferred acrylic polymers useful as flow control agents are polylauryl acrylate, polybutyl acrylate, poly (2-ethylhexyl acrylate), polylauryl methacrylate and polyisodecyl methacrylate.

Although acrylate flow control agents are preferred, fluorinated polymers having a surface tension, at the baking temperature of the powder, lower than that of the copolymer used in the mixture may be employed. Preferred flow control agents, if the agent is a fluorinated polymer are esters of polyethyleneglycol or polypropylene glycol and fluorinated fatty acids. For example, an ester of polyethyleneglycol of molecular weight of over 2500 and perfluoro octanoic acid is a useful flow control agent. Polymeric siloxanes of molecular weight ($\overline{M}_n$) over 1,000, advantageously 1,000 to 20,000, may also be useful as flow control agents, e.g., alkyl substituted siloxanes such as polydimethyl siloxane, polymethylphenyl siloxane, polydiphenyl siloxanes, and halogenated siloxanes such as poly 3,3,3-trifluoropropylmethyl siloxane), poly(perfluorodimethyl siloxane, poly(pentafluorophenyl methyl siloxane), etc.

Since the powder coating compositions of the invention may be applied to articles by electrostatic spray techniques, the composition may include a small weight percent of an anti-static agent. In particular, the anti-static agent is included in a range of from about 0.05 to about 1.0 weight percent of the total powder composition. Suitable anti-static agents include, but are not limited to tetraalkyl ammonium salts as discussed previously and which also serve as catalysts. Other suitable anti-static agents include: alkyl poly (ethyleneoxy) phosphate or alkyllauryl poly (ethyleneoxy) phosphates such as ethyl benzyl poly (ethyleneoxy) phosphate, polyethyleneimine, poly (2-vinyl pyrolidone), pyridinum chloride, poly (vinyl pyridinium chloride), polyvinyl alcohol, and inorganic salts.

A plasticizer may be used in the powder coating compositions of this invention if desired. The types of plasticizers used very often include adipates, phosphates, phthalates, sebacates, polyesters derived from adipic acid or azelaic acid, and epoxy or epoxidized plasticizers. Exemplary of the many plasticizers which may be employed are: dihexyl adipate, diisooctyl adipate, dicyclohexyl adipate, triphenyl phosphate, tricresyl phosphate, tributyl phosphate, dibutylphthalate, dioctylphthalate, butyl octyl phthalate, dioctyl sebacate, butyl benzyl sebacate, dibenzyl sebacate, butanediol-1,4diglycidyl ether and cellulose acetate butyrate.

In order to give individual powder coating compositions a suitable color, a pigment may be included. In general the pigment forms from about 6 to about 35 weight percent of the total powder coating composition. Pigments which are suitable for powder coating compositions include, but are not limited to the following: basic lead silica chromate, 30 percent by weight(orange); titanium dioxide, 30 percent by weight (white); titanium dioxide, 15 percent by weight, plus ultra marine blue, 10 weight percent (blue); phthalocyanine blue, 7 weight percent, plus titanium dioxide, 10 weight percent (blue); phthalocyanine green, 7 weight percent, plus titanium dioxide, 10 weight percent (green); ferrite yellow, 7 weight percent, plus titanium dioxide, 10 weight percent (yellow); carbon black, 6 weight percent (black); black iron oxide, 10 weight percent (black); chromium green oxide, 8 weight percent, plus titanium dioxide, 16 weight percent (red); and iron oxide transparent orange pigment, 10 weight percent (orange). Metallic pigment such as aluminum may also be included up to 10 weight percent to give the baked coating a metallic appearance.

Having described the various materials which are employed in formulating the powder coating compositions of this invention, a plurality of examples are hereinafter set forth to illustrate the same. It should be understood that the specific examples are presented by way of illustration and not by way of limitation.

EXAMPLE I

The monomers, glycidyl methacrylate 15% by weight, methyl methacrylate 45% by weight and butyl methacrylate 40% by weight are mixed together. Three weight percent of a catalyst 2,2'-azobis-(2-methylpropionitrile) (AIBN) is dissolved in the monomer mixture. The mixture is slowly added to refluxing toluene (100 parts) which is stirred vigorously under a nitrogen atmosphere. A condenser is provided at the top of the toluene container to condense the toluene vapors and return them to the container. The monomer mixture is added through a regulating valve and the rate of addition is controlled to maintain a reflux temperature (109° C–112° C) with only a small fraction of heat supplied from an external heater. After the addition of the monomer mixture is complete, the refluxing is maintained by external heat source for 3 additional hours.

The solution is poured into shallow stainless steel trays. These trays are placed in a vacuum oven and the solvent evaporated therefrom. As the solvent is removed, the copolymer solution becomes more concentrated. The temperature of the vacuum oven is raised to about 110° C. Drying is continued until the solvent content of the copolymer is below 3 percent. The trays are cooled and the copolymer collected and ground to pass through 20 mesh screen. The copolymer has a glass transition temperature of 53° C and a molecular weight ($\overline{M}_n$) of 4000.

A carboxyl terminated polymer is made in the following manner. Five hundred grams of Epon 1001 (epoxide equivalent 500g) is charged into a 500 ml stainless steel beaker having a heating mantle. The epoxy resin is heated to 110° C. As the epoxy resin is stirred, 194 grams of azelaic acid is added. After a reaction time of 30 minutes, a homogeneous mixture is obtained. The mixture resin, only semi-reacted, is poured out into an aluminum pan and cooled. The solid mixture is pulverized to pass through a 100 mesh screen by use of a blender. The mixture resin is only semi-reacted because if fully reacted it could not be powdered. A portion of the carboxy terminated polymer is weighed out for making a powder coating composition of this invention.

One hundred parts by weight of the ground copolymer are mixed with the following materials:

| | |
|---|---|
| Carboxyl terminated polymer | 73 parts |
| Tetrabutyl ammonium bromide | 0.2 parts |
| Polylauryl actylate ($\overline{M}_n = 10,000$) | 0.5 parts |
| Titanium dioxide | 30 parts |

The materials are mixed together in a ball mill for 2 hours. The mixture is milled rolled at 85° C to 90° C for 5 minutes. The solid obtained is ground in a ball mill to pass through a 140 mesh screen.

The resulting powder thus obtained is a powder coating composition of the invention. The powder is sprayed on an electrically grounded, steel panel by using electrostatic powder spray gun operating at 50 KV charging voltage. After spraying, the panel is heated at 170° C for 20 minutes.

The coating obtained on the panel has good adhesion to the steel panel and good impact strength. The coating also is applied to and has good adhesion on panels of glass, brass, zinc, aluminum, copper and bronze. The coating obtained is not soluble in toluene, gasoline, butanone or methanol.

EXAMPLE II

The procedure of Example I is repeated with the exception that 10.0 parts of azelaic acid is used as the crosslinking agent. The powder is applied to and cured on panels of steel and glass. The coatings exhibited good adhesion, impact strength and solvent resistance.

EXAMPLE III

The procedure of Example I is repeated with the exception that a mixture comprising 9.0 parts of azelaic acid and 2.1 parts of lauric acid is employed as the crosslinking agent. The coatings exhibit good adhesion, impact strength and solvent resistance on various substrates.

EXAMPLE IV

The procedure of Example I is repeated. The formation of the copolymer, however, begins with a monomer mixture having glycidyl methacrylate 8% by weight, methyl methacrylate 52% by weight and butyl methacrylate 40% by weight. Three weight percent of the catalyst AIBN is employed. When the procedure of Example I is followed, the resulting copolymer has a glass transition temperature of 58° C and a molecular weight of 4000.

A carboxyl terminated polymer is made in the following manner. One hundred ninety five grams of Epon 1002 (epoxide equivalent 650) is charged into a 500 ml stainless steel beaker having a heating mantle. The epoxy resin is heated until it is melted. As the epoxy resin is stirred, 60 grams of azelaic acid and 0.5 grams of tetrabutylammonium iodide is added. The time of addition is 30 minutes and the stirring is maintained so that a homogeneous mixture is obtained. The resin mixture is then heated to 150° C for 1 hour. The resin mixture is poured into an aluminum pan and cooled. The solid carboxyl terminated epoxy ester is pulverized by a blender to pass through a 100 mesh screen. A portion of this carboxyl terminated polymer is weighed out for making a powder coating composition of this invention.

One hundred parts of the copolymer produced is mixed with the same additional ingredients set forth in Example I, except using 43 parts of the carboxyl terminated powder prepared. The quality of the painted panels obtained after application of the powder coating to various materials is about the same as achieved in Example I.

EXAMPLE V

The procedure of Example IV is repeated with the exception that 5.3 parts of azelaic acid is employed as the crosslinking agent. The coatings are of comparable quality.

EXAMPLE VI

The procedure of Example IV is repeated with the exception that a mixture comprising 5.0 parts of azelaic acid and 0.6 parts of lauric acid is employed as the crosslinking agent. The coatings are of comparable quality.

EXAMPLE VII

A monomer mixture having the following composition is prepared: glycidyl acrylate 12% by weight, methyl methacrylate 58% by weight, and butyl methacrylate 30% by weight. The monomer mixture is processed in the same manner as described in Example I with 3% by weight of the catalyst AIBN employed. A carboxyl terminated polymer is prepared as described in Example IV except 650 g Epon 1002 (epoxy equivalent 852) and 202 g of sebacic acid are reacted. One hundred parts of the copolymer is mixed with the same additional ingredients described in Example I, except 72 parts of the carboxyl terminated powder prepared are used.

The powder coating composition obtained by following the process steps set forth in Example I is applied to test panels in the same manner as described in Example I. The coating is baked at a temperature of 170° C for 30 minutes. The coating obtained has good adhesion to steel, glass, brass, zinc, aluminum, copper and bronze.

EXAMPLE VIII

The procedure of Example VII is followed with the exception that 47 parts of a carboxyl terminated polybutadiene ($\overline{M}_n = 1,000$) is employed as the crosslinking agent.

EXAMPLE IX

The procedure of Example VII is repeated with the exception that 42 parts of a carboxyl terminated butadieneacrylonitrile copolymer (30 weight percent acrylonitrile, $\overline{M}_n = 1,000$) is employed as the crosslinking agent.

EXAMPLE X

A monomer mixture having the following composition is prepared: glycidyl methacrylate 20% by weight, methyl methacrylate 40% by weight and butyl methacrylate 40% by weight. A copolymer is formed from this monomer mixture in accordance with the same procedure as is outlined in Example I. In this case, 1% by weight of the catalyst AIBN is added. The copolymer produced has a glass transition temperature of 51° C and a molecular weight of 8500.

A carboxyl terminated polymer is prepared as described in Example IV. In this case, however, 650 grams Epon 1002 (epoxide equivalent 844) is reacted with 194 grams of axelaic acid.

The ground copolymer (100 parts by weight) is added to the following materials:

| | |
|---|---|
| Carboxyl terminated polymer | 118 parts |
| Tetrabutylammonium chloride | 0.1 parts |
| Polybutylacrylate ($\overline{M}_n = 9000$) | 4 parts |
| Titanium dioxide | 15 parts |
| Ultra marine blue | 10 parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 170° C for 10 minutes is of good quality and is solvent and scratch resistant.

EXAMPLE XI

The procedure of Example X is repeated except that 10.3 parts of adipic acid is used as the crosslinking agent and 1 part of polydiphenyl siloxane ($\overline{M}_n = 10,000$) is used as the flow control agent.

EXAMPLE XII

The procedure of Example X is repeated except that a mixture of 9.7 parts adipic acid and 2.3 parts stearic acid is used as the crosslinking agent and 0.8 parts of polydimethyl siloxane ($\overline{M}_n = 12,000$) is used as the flow control agent.

EXAMPLE XIII

A monomer mixture having the following composition is prepared: glycidyl acrylate 25% by weight, methyl methacrylate 50% by weight and butyl methacrylate 25% by weight. The monomers are reacted as described in Example I to produce a copolymer. In this case, 6% by weight of the catalyst AIBN is employed. The resulting copolymer has a glass transition temperature of 53° C and a molecular weight of 2000.

A carboxyl terminated polymer is prepared as described in Example IX. In this case, however, 950 grams Epon 1004 (epoxide equivalent 1144) is reacted with 194 grams of azelaic acid.

One hundred parts by weight of the copolymer obtained is mixed with the following materials:

| | |
|---|---|
| Carboxyterminated polymer | 180 parts |
| 2-methyl-4-ethylimidazole | 0.05 parts |
| Dibutyl poly(ethyleneoxy phosphate) | 0.05 parts |
| Polyisododecyl methacrylate | 4 parts |
| Titanium dioxide | 10 parts |
| Phthalocyanine blue | 7 parts |

A powder coating composition is obtained by following the process steps set forth in Example I. The coating composition is applied to a series of test panels and baked at the temperature of and for the same time as Example X. The coating obtained on the various test panels is of good quality with respect to its adhesion, appearance and impact characteristics.

EXAMPLE XIV

The procedure of Example XIII is repeated except that 12.8 parts of pimelic acid is used as the crosslinking agent. The coatings are of comparable quality.

EXAMPLE XV

The procedure of Example XIII is repeated with the exception that a mixture of 12.2 parts of pimelic acid and 2.2 parts of stearic acid is used as the crosslinking agent.

EXAMPLE XVI

A monomer mixture having the following composition is prepared: glycidyl methacrylate 15% by weight, butyl acrylate 20% by weight and methyl methacrylate 65% by weight. The monomer is reacted as set forth in Example I in order to produce a copolymer. Four percent by weight of the catalyst AIBN is employed in reacting the monomer mixture to form the copolymer. The copolymer has a glass transition temperature of 65° C and a molecular weight of 3000.

A carboxyl terminated polymer is prepared as described in Example IV. In this case, however, 650 grams of Epon 1002 (epoxide equivalent 844) is reacted with 194 grams of azelaic acid.

One hundred parts by weight of the copolymer obtained is added to the following materials:

| | |
|---|---|
| Carboxylterminated polymer | 89 parts |
| Triethylene diamine | 0.1 parts |
| Tetraethylammonium chloride | 0.5 parts |
| Polylaurylmethacrylate ($\overline{M}_n = 6000$) | 2 parts |
| Phthalocyanine green | 7 parts |
| Titanium dioxide | 10 parts |

The above described materials are processed as described in Example I in order to produce a powder coating composition. The powder coating composition is applied to test panels as described in Example I and baked on the panels at a temperature of 150° C for 15 minutes.

The coating obtained has good adhesion to steel, glass, brass, zinc, aluminum, copper and bronze and is insoluble in toluene, gasoline, methanol and butanone.

EXAMPLE XVII

The procedure of Example XVI is repeated with the exception that 9.3 parts of suberic acid is used as the crosslinking agent.

EXAMPLE XVIII

The procedure of Example XVI is repeated with the exception that a mixture of 8.5 parts suberic acid and 2.6 parts of palmitic acid is used as the crosslinking agent.

EXAMPLE XIX

A monomer mixture having the following composition is prepared: glycidyl methacrylate 15% by weight, methyl methacrylate 50% by weight and styrene 35% by weight. The monomers are reacted in accordance with the procedure set forth in Example I with 3% by weight of the catalyst AIBN being utilized. The resulting ground copolymer has a molecular weight of 4500 and a glass transition temperature of 90° C.

A carboxyl terminated polymer is prepared as described in Example IV. In this case, however, 190 grams of Epon 828 (epoxide equivalent 384) is reacted with 194 grams of azelaic acid.

One hundred parts by weight of the copolymer obtained is added to the following materials:

| | |
|---|---|
| Carboxylterminated polymer | 39 parts |
| Tetramethylammonium chloride | 1 part |
| Poly(2-ethylhexyl acrylate) | 2 parts |
| Ferrite yellow | 7 parts |
| Titanium dioxide | 10 parts |

The mixture is processed as described in Example I in order to form a powder coating composition. The powder coating composition is applied to test panels as described in Example I. The panels are baked at a temperature of 170° C for 5 minutes. The adhesion quality of the powder coating after baking on the various test panels is good. The coating on each panel possesses good solvent and scratch resistance.

EXAMPLE XX

The procedure of Example XIX is repeated with the exception that 10.8 parts of sebacic acid is used as the crosslinking agent and 0.5 parts of polymethylphenyl siloxane ($\overline{M}_n = 8,000$) is employed as the flow control agent.

EXAMPLE XXI

The procedure of Example XIX is repeated except that a mixture of 10.1 parts of sebacic acid and 1.47 parts of undecanoic acid is used as the crosslinking agent and 1.2 parts of polymethylphenyl siloxane ($\overline{M}_n = 4,000$) is used as the flow control agent.

EXAMPLE XXII

A monomer mixture having the following composition is formed: glycidyl methacrylate 18% by weight, ethyl acrylate 20% by weight, methyl methacrylate 40% by weight, vinyl chloride 22% by weight. The monomer mixture is polymerized by using 2 weight percent of AIBN as the initiator.

A carboxyl terminated polymer is prepared as described in Example IV. In this case, however, 650 grams of Epon 1002 (epoxide equivalent 894) is reacted with 244 grams of brassylic acid.

One hundred parts of the ground copolymer obtained is added to the following materials:

| | |
|---|---|
| Carboxylterminated polymer | 113 parts |
| Trimethyl benzyl ammonium chloride | 0.1 part |
| Poly(2-ethylhexyl acrylate) ($\overline{M}_n = 11,000$) | 2 parts |
| Carbon black | 6 parts |

The above materials are mixed and processed as set forth in Example I. The resulting powder coating composition is applied to test panels as specified in Example I. The coating composition is baked at 170° C for 15 minutes. All the painted panels exhibit good adhesion and solvent resistant properties.

EXAMPLE XXIII

A copolymer containing 18 weight percent glycidyl acrylate, 15 weight percent ethyl acrylate, 45 weight percent methyl methacrylate and 22 weight percent vinyl chloride is prepared in accordance with the procedure of Example I.

One hundred parts of the copolymer is mixed with the following:

| | |
|---|---|
| Tetradecanoic acid | 14.8 parts |
| Trimethylbenzyl ammonium chloride | 0.1 parts |
| Poly(2-ethylhexyl acrylate) ($\overline{M}_n = 11.000$) | 2 parts |
| Carbon black | 6 parts |

The materials are mixed in accordance with Example I procedure and applied to various substrates.

EXAMPLE XXIV

The procedure of Example XXIII is repeated with the exception that a mixture of 13.4 parts tetradecanoic acid and 1.5 parts capric acid is used as the crosslinking agent.

EXAMPLE XXV

A monomer mixture having the following composition is formed: glycidyl methacrylate 15% by weight, methyl methacrylate 30% by weight, isobutyl acrylate 25% by weight, alpha methyl styrene 15% by weight and methacrylonitrile 15% by weight. The monomer mixture is reacted in the same manner as described in Example I. Three percent of the catalyst AIBN is employed. The resulting copolymer has a glass transition temperature of 46° C and a molecular weight of 4500.

A carboxyl terminated polymer is prepared as described in Example IV. In this case, however, 650 grams of Epon 1002 (epoxide equivalent 796) is reacted with 220 grams of adipic acid.

One hundred parts of the ground copolymer obtained is added to the following materials:

| | |
|---|---|
| Carboxylterminated polymer | 46 parts |
| Dodecyldimethyl (2-phenoxy-ethyl) ammonium bromide | 0.5 parts |
| Polyethylene glycol perfluoro octonoate ($\overline{M}_n = 3400$) | 2 parts |
| Black iron oxide | 10 parts |

The mixture so formed is processed as described in Example I to produce a powder coating composition. This powder coating composition is applied to test panels as it is described in Example I. The coated panels are baked at 165° C for 15 minutes. The coating on each panel has good adhesion and solvent resistance.

EXAMPLE XXVI

The procedure of Example XXV is repeated with the exception that 13 parts of brassylic acid is used as the crosslinking agent and 0.9 parts of poly(3,3,3-trifluoropropyl methyl siloxane) ($\overline{M}_n = 7,000$) is used as the flow control agent.

EXAMPLE XXVII

The procedure of Example XXV is repeated with the exception that the crosslinking agent comprises a mixture of 12.6 parts brassylic acid and 0.2 parts stearic acid.

EXAMPLE XXVIII

A monomer mixture is formed having the following composition: glycidyl methacrylate 12% by weight, methyl methacrylate 50% by weight, 2-ethylhexyl acrylate 10% by weight and acrylonitrile 28% by weight. The monomer mixture is processed as set forth in Example I in order to form a copolymer. Four percent by weight of the catalyst AIBN is added. The copolymer formed has a glass transition temperature of 60° C and a molecular weight of 4000.

A carboxyl terminated polymer is prepared by reacting 213 grams of Ciba Cy178 (epoxide equivalent 407) with 142 grams of azelaic acid.

One hundred parts by weight of the ground copolymer is mixed with the following materials:

| | |
|---|---|
| Carboxylterminated polymer | 75 parts |
| Stannous octoate | 0.5 parts |
| Tetraethylammonium bromide | .05 parts |
| Polyethylene glycol perfluoro octonate ($M_n$ = 3500) | 2 parts |
| Quindo red | 5 parts |
| Titanium dioxide | 16 parts |

The mixture above described is processed as set forth in Example I to produce a powder coating composition. The powder coating composition is applied to test panels as described in Example I. The panels are baked at 150° C for 20 minutes. The adhesion to the panels of the powder coating is good and each coating possesses good solvent resistance.

EXAMPLE XXIX

A copolymer comprising 10 weight percent glycidyl acrylate, 50 weight percent methyl methacrylate, 30 weight percent butyl methacrylate and 10 weight percent vinyl acetate is prepared in accordance with Example I using four percent by weight of AIBN as a catalyst.

One hundred parts by weight of the ground copolymer is mixed with the following materials:

| | |
|---|---|
| Nonadecanoic acid | 25.0 parts |
| Stannous octoate | 0.5 parts |
| Polyethylene glycol perfluoro octoate | 2 parts |
| Quindo red | 5 parts |
| Titanium dioxide | 15 parts |

The mixture is processed as set forth in Example I to produce a powder coating composition. The powders are applied to and cured on various substrates. The coatings exhibit good adhesion, abrasion resistance and solvent resistance.

EXAMPLE XXX

The procedure of Example XXIX is repeated with the exception that a mixture of 24.0 parts nonadecanoic acid and 1.1 parts of undecanoic acid is employed as the crosslinking agent.

EXAMPLE XXXI

A monomer mixture having the following composition is prepared: glycidyl methacrylate 22% by weight, n-hexyl methacrylate 20% by weight, butyl methacrylate 25% by weight and acrylonitrile 33% by weight. A copolymer is formed from this monomer mixture in accordance with the same procedure as is outlined in Example I. In this case, 1.5% by weight of the catalyst AIBN is added. The copolymer produced has a glass transition temperature of 40° C and a molecular weight of 7500.

A carboxyl terminated polymer is prepared as described in Example IV. In this case, however, 650 grams of Epon 1002 (epoxide equivalent 796) is reacted with 146 grams of adipic acid.

The ground copolymer (100 parts by weight) is added to the following materials:

| | |
|---|---|
| Carboxylterminated polymer | 123 parts |
| Zinc octoate | 0.8 parts |
| Tetrabutylammonium iodide | 1.0 parts |
| Polybutyl acrylate | 2.0 parts |
| Iron oxide transparent orange | 10 part |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 140° C for 20 minutes is of good quality and is solvent and scratch resistant.

EXAMPLE XXXII

The procedure of Example XXI is repeated except that 27.2 parts of docasandoic acid is used as the crosslinking agent and 5 parts of poly(perfluorodimethyl siloxane) is used as the flow control agent.

EXAMPLE XXXIII

The procedure of Example XXXI is repeated with the exception that the crosslinking agent comprises a mixture of 24.5 decosandoic acid and 3.12 tridecanoic acid.

EXAMPLE XXXIV

A monomer mixture having the following composition is prepared: glycidyl methacrylate 10% by weight, methyl methacrylate 45% by weight, butyl methacrylate 35% by weight and vinyl acetate 10% by weight. A copolymer is formed from this monomer mixture in accordance with the same procedure as is outlined in Example I. In this case, 3% by weight of the catalyst AIBN is added.

A carboxyl terminated polymer is prepared as described in Example IV. The same epoxy resin and dicarboxylic acid as described in that Example are used.

The ground copolymer (100 parts by weight) is added to the following materials:

| | |
|---|---|
| Carboxylterminated polymer | 54 parts |
| Tetrabutylammonium bromide | 2 parts |
| Poly (2-ethylhexyl acrylate) | 3.5 Parts |
| Carbon black | 6 parts |

The above ingredients are mixed together and processed in accordance with the procedure of Example I to obtain a powder coating composition. The powder coating composition is sprayed on various test panels. The coating obtained on each test panel after curing of the powder coating composition at a temperature of 160° C for 10 minutes is of good quality. Also, the coating obtained on each test panel is insoluble in toluene, gasoline, methanol and butanone.

EXAMPLE XXXV

The procedure of Example XXXIV is repeated except that 5.0 parts of adipic acid is used as the crosslinking agent.

EXAMPLE XXXVI

The procedure of Example XXXIV is repeated except that a mixture 4.9 parts adipic acid and 0.3 parts myristic acid is used as the crosslinking agent.

EXAMPLE XXXVII

A monomer mixture having the following composition is prepared: glycidyl methacrylate 8% by weight, methyl methacrylate 52% by weight and isobutyl methacrylate 40% by weight. A copolymer is formed from this monomer mixture in accordance with the same procedure as is outlined in Example I. In this case, 5% by weight of the catalyst AIBN is added. The copolymer produced has a glass transition temperature of 75° C and a molecular weight of 3200.

A carboxyl terminated polymer is prepared as described in Example II. In this case, however, 650 grams of Epon 1002 (epoxide equivalent 852) is reacted with 202 grams of sebacic acid.

The ground copolymer (100 parts by weight) is added to the following materials:

| | |
|---|---|
| Carboxylterminated polymer | 5.2 parts |
| Tetrabutylammonium bromide | 2 parts |
| Polylauryl acrylate | 4 parts |
| Titanium dioxide | 30 parts |

The above ingredients are mixed together and processed in accordance with the procedure of Example I to obtain a powder coating composition. The powder coating composition is sprayed on various test panels of steel, brass, glass, zinc, aluminum, copper and bronze. The coating obtained on each test panel after curing of the powder coating composition at a temperature of 130° C for 10 minutes is of good quality and is solvent and scratch resistant.

EXAMPLE XXXVIII

The procedure of Example XXXVII is repeated except that 3.7 parts of succinic acid is used as the crosslinking agent.

EXAMPLE XXXIX

The procedure of Example XXXVII is repeated except that a mixture of 3.6 parts of succinic acid and 0.43 parts of palmitic acid is used as the crosslinking agent.

EXAMPLE XXXX

A monomer mixture having the following composition is prepared: glycidyl methacrylate 10% by weight, methyl methacrylate 67% by weight and n-butyl methacrylate 23% by weight. A copolymer is formed from this monomer mixture in accordance with the procedure as is outlined in Example I. In this case, 4% by weight of the catalyst AIBN is added. The copolymer produced has a glass transition temperature of 73° C and a molecular weight of 3000.

The ground copolymer (100 parts by weight) is added to the following materials:

| | |
|---|---|
| Carboxylterminated polybutadiene ($\overline{M}_n$ = 1600) | 5 parts |
| Tetrabutylammonium chloride | 0.7 parts |
| Polybutyl acrylate | 2 parts |
| Titanium dioxide | 30 parts |

The above ingredients are mixed together and processed in accordance with the procedure of Example I to obtain a powder coating composition. The powder coating composition is sprayed on various test panels. The coating obtained on each test panel after curing of the powder coating composition at a temperature of 170° C for 15 minutes is of good quality. Also, each of the test panels coating's is resistant to and insoluble in toluene, gasoline, methanol and butanone.

EXAMPLE XXXXI

The procedure of Example XXXX is repeated with the exception that 70 parts of a carboxyl terminated butadieneacrylonitrile containing 45 parts by weight of acrylonitrile and having a molecular weight ($\overline{M}_n$) of 2000 is employed as the crosslinking agent.

EXAMPLE XXXXII

A monomer mixture having the following composition is prepared: glycidyl methacrylate 15% by weight, methyl methacrylate 32% by weight, ethyl acrylate 15% by weight, isobutyl acrylate 8% by weight and styrene 30% by weight. A copolymer is formed from this monomer mixture in accordance with the same procedure as is outlined in Example I. In this case, 3% by weight of the catalyst AIBN is added.

A carboxyl terminated polyester is prepared by reacting 76 grams of ethylene glycol with 183 grams of o-phthalic acid.

The ground copolymer (100 parts by weight) is added to the following materials:

| | |
|---|---|
| Carboxylterminated polymer | 120 parts |
| Tetraethylammonium bromide | 1 part |
| Polyisodecyl methacrylate ($\overline{M}_n$ = 5000) | 1.5 parts |
| Titanium dioxide | 30 parts |

The above ingredients are mixed together and processed in accordance with the procedure of Example I to obtain a powder coating composition. The powder coating composition is sprayed on various test panels of steel, glass, brass, zinc, aluminum, copper and bronze. The coatings obtained on each test panel after curing of the powder coating composition at a temperature of 120° C for 15 minutes is of good quality and has good adhesion characteristics. The powder coating composition on each panel is resistant to the solvents previously mentioned.

EXAMPLE XXXXIII

A monomer mixture having the following composition is prepared: glycidyl methacrylate 15% by weight, methyl methacrylate 40% by weight, 2-ethylhexyl acrylate 15% by weight, alpha methyl styrene 20% by weight and acrylonitrile 10% by weight. A copolymer is formed from this monomer mixture using 4% by weight of the catalyst AIBN.

A carboxyl terminated polyester is prepared by reacting 45 grams of 1,4 butane diol with 194 grams of azelaic acid.

The ground copolymer (100 parts by weight) is added to the following materials:

| | |
|---|---|
| Carboxylterminated polymer | 25 parts |
| Tetraethylammonium bromide | 0.4 parts |
| Poly(2-ethylhexyl acrylate) | 2 parts |
| Titanium dioxide | 30 parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 170° C for 20 minutes is of good quality and resistant to the aforementioned solvents.

EXAMPLE XXXXIV

A copolymer comprising 15% by weight glycidyl acrylate, 40% by weight methyl methacrylate, 15% by weight 2-ethylhexyl acrylate, 20% by weight 2-methyl styrene and 10% by weight acrylonitrile is prepared in accordance with the procedures of Example I.

A carboxyl terminated polyester is prepared by reacting 114 grams of Bisphenol A with 105 grams of adipic acid.

The ground copolymer (100 parts by weight) is added to the following materials:

| | |
|---|---|
| Caboxylterminated polymer | 100 parts |
| Tetraethylammonium bromide | 0.4 parts |
| poly(pentafluorophenylmethyl siloxane) ($M_n$ = 15,000) | 1.0 parts |
| Titanium dioxide | 30 parts |

The ingredients are mixed together, processed in accordance with the procedure of Example I and sprayed on various test panels. The coatings obtained after curing are of good quality.

EXAMPLE XXXXV

A monomer mixture having the following composition is prepared: glycidyl methacrylate 20% by weight, butyl acrylate 40% by weight, methyl methacrylate 10% by weight and styrene 30% by weight. A copolymer is formed from this monomer mixture in accordance with the same procedure as is outlined in Example I. In this case, 4% by weight of the catalyst AIBN is added. The copolymer produced has a glass transition temperature of 40° C and a molecular weight of 3000.

A carboxyl terminated polyester is prepared by reacting 40 grams of trimethylolethane with 70 grams of 1-4-cyclohexane dicarboxylic acid.

The ground copolymer (100 parts by weight) is added to the following materials:

| | |
|---|---|
| Carboxylterminated polymer | 47 parts |
| Tetraethylammonium bromide | 0.5 parts |
| Polylauryl acrylate | 1.0 parts |
| Titanium dioxide | 30 parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 170° C for 10 minutes is of good quality and is resistant to the aforementioned solvents.

EXAMPLE XXXXVI

A monomer mixture having the following composition is prepared: glycidyl methacrylate 15% by weight, 2-ethylhexyl acrylate 10% by weight, methyl methacrylate 50% by weight, methacrylonitrile 15% by weight and alpha methyl styrene 10% by weight. A copolymer is formed from this monomer mixture in accordance with the same procedure as is outlined in Example I. In this case, 4% by weight of the catalyst AIBN is added.

A carboxyl terminated polyester is prepared by reacting 14 grams of pentaerithritol with 94 grams of azelaic acid.

The ground copolymer (100 parts by weight) is added to the following materials:

| | |
|---|---|
| Carboxylterminated polymer | 20 parts |
| Tetraethylammonium bromide | 0.5 parts |
| Polylauryl acrylate | 2.5 parts |
| Titanium dioxide | 30 parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 135° C for 30 minutes is of good quality. Also, the coatings are resistant to and insoluble in toluene, gasoline, methanol and butanone.

EXAMPLE XXXXVII

A monomer mixture having the following composition is prepared: glycidyl methacrylate 30% by weight, methyl methacrylate 60% by weight, and n-butyl methacrylate 10% by weight. A copolymer is formed from this monomer mixture in accordance with the procedure as is outlined in Example I. In this case, 4% by weight of the catalyst AIBN is added.

A carboxyl terminated polymer is prepared as described in Example II. In this case, however, 650 grams of Epon 1002 (epoxide equivalent 1020) is reacted with 370 grams of docosandioc acid.

The ground copolymer (100 parts by weight) is added to the following materials:

| | |
|---|---|
| Carboxylterminated polymer | 108 parts |
| Lauric acid | 3.9 parts |
| Tetrabutylammonium chloride | 0.7 parts |
| Polybutyl acrylate | 2 parts |
| Titanium dioxide | 30 parts |

The above ingredients are mixed together and processed in accordance with the procedure of Example I to obtain a powder coating composition. The powder coating composition is sprayed on various test panels. The coating obtained on each test panel after curing of the powder coating composition at a temperature of 170° C for 15 minutes is of good quality. Also, each of the test panels coating's is resistant to and insoluble in toluene, gasoline, methanol and butanone.

EXAMPLE XXXXVIII

A monomer mixture having the following composition is prepared: glycidyl acrylate 30% by weight, methyl methacrylate 60% by weight, and n-butyl methacrylate 10% by weight. A copolymer is formed from this monomer mixture in accordance with the procedure as is outlined in Example I. In this case, 4% by weight of the catalyst AIBN is added.

A carboxyl terminated polymer is prepared as described in Example II. In this case, however, 650 grams of Epon 1002 is reacted with 160 grams of pimelic acid.

The ground copolymer (100 parts by weight) is added to the following materials:

| | |
|---|---|
| Carboxylterminated polymer | 170 parts |
| Stearic acid | 5.8 parts |
| Tetrabutylammonium chloride | 0.7 parts |
| Polybutyl acrylate | 2 parts |
| Titanium dioxide | 30 parts |

The above ingredients are mixed together and processed in accordance with the procedure of Example I to obtain a powder coating composition. The powder coating composition is sprayed on various test panels. The coating obtained on each test panel after curing of the powder coating composition at a temperature of 175° C for 18 minutes is of poor quality and shows low impact strength.

EXAMPLE XXXXIX

The procedures of Examples I-XXXXVIII are repeated with the exception that the flow control agent is omitted in each case. The coatings are applied to various substrates and cured at elevated temperatures.

In view of this disclosure, many modifications of this invention will be apparent to those skilled in the art. It is intended that all such modifications which fall within the true scope of this invention be included within the terms of the appended claims.

We claim:

1. A powder coating composition which, exclusive of pigments and other non-reactive components, comprises a coreactable mixture of:
    (A) a copolymer of about 8 to about 30 weight percent of a glycidyl ester of a monoethylenically unsaturated acid and about 92 to about 70 weight percent of other monoethylenically unsaturated monomers, said copolymer having a glass transition temperature in the range of 40° C to 90° C and a molecular weight ($\overline{M}_n$) in the range of 2500 to 8500; and
    (B) a carboxyl terminated crosslinking agent in an amount ranging from about 0.8 to about 1.2 carboxyl groups for each epoxy group in the copolymer.

2. A powder coating composition in accordance with claim 1 wherein said copolymer has a glass transition temperature between about 50° C and about 80° C and a molecular weight ($\overline{M}_n$) between about 3000 and about 6500, said glycidyl ester being present in said copolymer from at least about 10% by weight to no more than about 25% by weight.

3. A powder coating composition in accordance with claim 1 wherein said copolymer has a glass transition temperature between about 55° C and about 70° C and a molecular weight ($\overline{M}_n$) in the range of about 3000 to about 4000, said glycidyl ester being present in said copolymer from at least about 12% by weight to no more than about 20% by weight.

4. A powder coating composition in accordance with claim 1 wherein said monoethylenically unsaturated monomers consist essentially of monofunctional, alpha-beta olefinically unsaturated monomers.

5. A powder coating composition in accordance with claim 4 wherein said monofunctional, alpha-beta olefinically unsaturated monomers are acrylates.

6. A powder coating composition in accordance with claim 1 wherein said carboxyl terminated crosslinking agent comprises a carboxyl terminated epoxy ester.

7. A powder coating composition in accordance with claim 1 wherein said carboxyl terminated crosslinking agent comprises a mixture of a carboxyl terminated epoxy ester and a saturated aliphatic, monocarboxylic acid, said monocarboxylic acid comprising up to 10 percent by equivalent weight of the mixture.

8. A powder coating composition in accordance with claim 1 wherein said carboxyl terminated crosslinking agent comprises a carboxyl terminated polyester.

9. A powder coating composition in accordance with claim 1 wherein said carboxyl terminated crosslinking agent comprises a carboxyl terminated polybutadiene resin.

10. A powder coating composition in accordance with claim 1 wherein said carboxyl terminated crosslinking agent comprises a carboxyl terminated butadiene-acrylonitrile random copolymer.

11. A powder coating composition in accordance with claim 1 wherein said carboxyl terminated crosslinking agent comprises a saturated, aliphatic dicarboxylic acid containing 4 to 20 carbon atoms.

12. A powder coating composition in accordance with claim 1 wherein said carboxyl terminated crosslinking agent comprising a mixture of 90 to 98 percent by equivalent weight of a saturated aliphatic dicarboxylic acid containing 4 to 20 carbon atoms and 2 to 10 percent by equivalent weight of a saturated aliphatic monocarboxylic acid containing 10 to 22 carbon atoms.

13. A powder coating composition which, exclusive of pigments and other non-reactive components, comprises a coreactable mixture of:
    (A) a copolymer of about 8 to about 30 weight percent of a glycidyl ester of a monoethylenically unsaturated acid and about 92 to about 70 weight percent of other monoethylenically unsaturated monomers, said copolymer having a glass transition temperature in the range of 40° C to 90° C and a molecular weight ($\overline{M}_n$) in the range of 2500 to 8500; and
    (B) a carboxyl terminated crosslinking agent in an amount ranging from about 0.8 to about 1.2 carboxyl groups for each epoxy group in the copolymer, said crosslinking agent being selected from the group consisting of: (1) carboxyl terminated epoxy esters; (2) mixtures of carboxyl terminated epoxy esters and a saturated, aliphatic monocarboxylic acid comprising up to 10 percent by equivalent weight of the mixture; (3) carboxyl terminated polyesters; (4) carboxyl terminated polybutadiene, (5) carboxyl terminated random copolymers of butadiene and acrylonitrile; (6) saturated, aliphatic dicarboxylic acids containing 4 to 20 carbon atoms; (7) mixtures of 90 to 98 percent by equivalent weight of a saturated, aliphatic dicarboxylic acid containing 4 to 20 carbon atoms and 2 to 10 percent by equivalent weight of a saturated, aliphatic monocarboxylic acid containing 10 to 22 carbon atoms.

14. A powder coating composition in accordance with claim 13 wherein said copolymer has a glass transition temperature between about 50° C and about 80° C and a molecular weight ($\overline{M}_n$) between about 3000 and about 6500, said glycidyl ester being present in said copolymer from at least about 10 percent to no more than about 25 percent by weight.

15. A powder coating composition in accordance with claim 13 wherein said copolymer has a glass transition temperature between about 55° C and about 70° C and a molecular weight ($\overline{M}_n$) in the range of about 3000 to about 4000, said glycidyl ester being present in said copolymer from at least about 12 percent by weight to no more than about 20 percent by weight.

16. A powder coating composition in accordance with claim 13 wherein said monoethylenically unsaturated monomers consist essentially of monofunctional, alpha-beta olefinically unsaturated monomers.

17. A powder coating composition in accordance with claim 16 wherein said monofunctional, alpha-beta olefinically unsaturated monomers consist essentially of monofunctional, alpha-beta olefinically unsaturated monomers.

18. A powder coating composition in accordance with claim 16 wherein said monofunctional, alpha-beta olefinically unsaturated monomers are acrylates.

19. A powder coating composition in accordance with claim 18 wherein said acrylates consist essentially of esters of $C_1 - C_8$ monohydric alcohols and acrylic or methacrylic acid.

20. A powder coating composition in accordance with claim 16 wherein said monofunctional, alpha-beta olefinically unsaturated monomers consist essentially of a mixture of acrylates and vinyl hydrocarbons, said acrylates comprising greater than 50 weight percent of the monomer content of the copolymer.

21. A powder coating composition in accordance with claim 20 wherein said vinyl hydrocarbons are selected from the group consisting of styrene, alpha-methyl styrene, vinyl toluene, t-butyl styrene and chlorostyrene.

22. A powder coating composition in accordance with claim 13 wherein said copolymer includes up to 35 weight percent of modifying monomers selected from the group consisting of vinyl chloride, acrylonitrile, methacrylonitrile and vinyl acetate.

* * * * *

Disclaimer 4,091,049.—*Santokh S. Labana*, Dearborn Heights; and *Yun-Feng Chang*, Plymouth, Mich. POWDER COATING COMPOSITIONS CONTAINING GLYCIDYL ESTER COPOLYMERS AND CARBOXYL TERMINATED CROSSLINKING AGENT. Patent dated May 23, 1978. Disclaimer filed Oct. 15, 1985, by the assignee, *Ford Motor Co.*

Hereby enters this disclaimer to claims 1, 2, 3, 4, 5, 8, 11, 13, 14, 15, 16, 17, 18, 19, 20, 21 and 22 of said patent.

[*Official Gazette December 31, 1985.*]